A. J. ROEFFS.
DRIP CONNECTION FOR FIRE COCKS, HYDRANTS, AND THE LIKE.
APPLICATION FILED APR. 1, 1913.

1,216,499.

Patented Feb. 20, 1917.

Witnesses:
Robert H. Weir
C. E. Kane

Inventor
Anton J. Roeffs
By Jones Addington Ames & Seibold
Attys.

UNITED STATES PATENT OFFICE.

ANTON J. ROEFFS, OF BATAVIA, ILLINOIS, ASSIGNOR TO U. S. WIND ENGINE & PUMP CO., OF BATAVIA, ILLINOIS, A CORPORATION OF ILLINOIS.

DRIP CONNECTION FOR FIRE-COCKS, HYDRANTS, AND THE LIKE.

1,216,499.   Specification of Letters Patent.   Patented Feb. 20, 1917.

Application filed April 1, 1913. Serial No. 758,128.

*To all whom it may concern:*

Be it known that I, ANTON J. ROEFFS, a citizen of the United States, residing at Batavia, in the county of Kane and State of Illinois, have invented new and useful Improvements in Drip Connections for Fire-Cocks, Hydrants, and the like, of which the following is a full, clear, concise, and exact description, reference being had to the accompanying drawing, forming a part of this specification.

My invention relates to a drip connection for fire-cocks, hydrants and the like, and has for its object the provision of a device of the character specified which is adapted to be interposed between the hose connection of an ordinary fire-cock or the like and the hose itself to drain off the water leaking and dripping from such hose connection when the fire-cock is supposed to be closed, and thereby to prevent such water from reaching the hose and causing it to rot or otherwise deteriorate.

In the accompanying drawings I have illustrated one embodiment of my invention, in which drawings—

Figure 1:
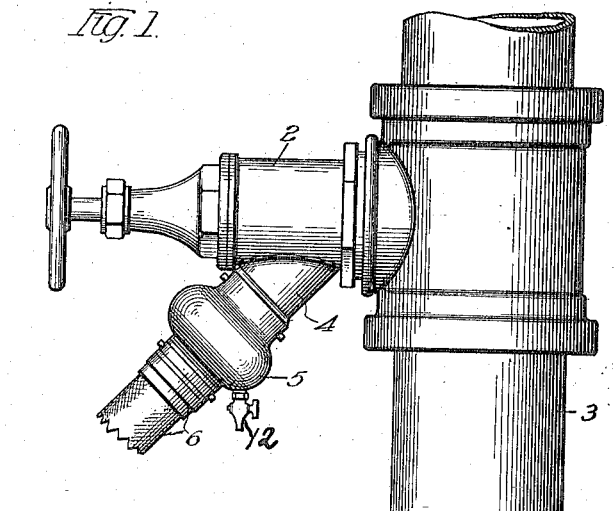
Figure 2:
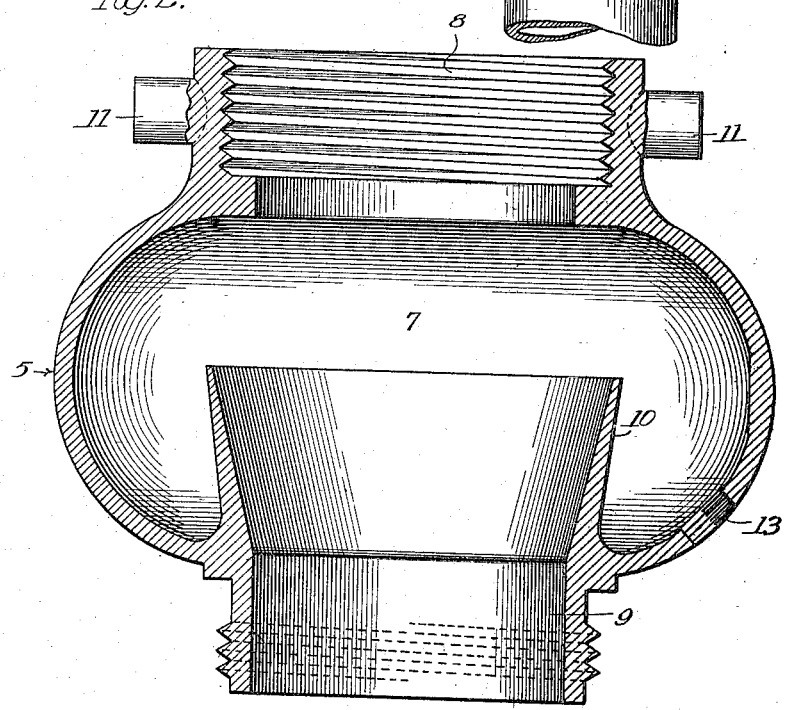

Figure 1 is a side elevation of a fire-cock or hydrant such as is commonly placed in buildings for fire protection; and Fig. 2 is a central longitudinal cross-section of the device.

In these drawings, the fire cock or hydrant 2 is shown connected with the water pipe or main 3 and is provided with the usual threaded hose connection 4. This fire cock is of the type usually installed in buildings for protection against fire, and in such cases it is common to have the hose connected to the fire cock at all times in order that it may be ready for use at a moment's notice. The remainder of the hose is wound on a suitable reel, or piled or hung up in position for convenient use.

Such fire cocks or hydrants, however, are generally subject to leakage, and in case the hose is left connected therewith for some time, the hose becomes damp and wet and is caused to rot or deteriorate, so that frequent renewals are necessary if the hose is to be kept in serviceable condition, or if not renewed and a fire occurs the hose bursts and the protection fails.

The drip connection which I provide to overcome the difficulty is indicated at 5 and as seen in Fig. 1 is interposed between the fire-cock connection 4 and the hose 6. This drip connection 5 comprises preferably a brass casting forming a hollow chamber 7 having at one side an internally threaded connection 8 of such size as to fit and be threaded on to the hose connection 4 of the hydrant. The central opening through this connection 8 communicates with the interior of said chamber 7. On the opposite side of said chamber is a projection 9 externally screw-threaded to form a hose connection for a hose such as 6, and having likewise a central opening communicating with said chamber 7.

Surrounding the opening in the hose connection 9, and within the chamber 7, is a flange 10, preferably cast integral with the walls of the chamber. This flange is shown of the same inside diameter as the opening in the hose connection 9 at the line of juncture therewith, and flares outwardly in funnel form toward the inside of the chamber. This flange is preferably of substantially the height or depth shown but may be made any desired height and form, although it should be so constructed as not to impede the passage of water therethrough when the hose is in use. The hydrant connection 8 is provided with lugs or ears 11 similar to those of the ordinary hose connection for the application of a suitable wrench to tighten or loosen the same on the hose connection of the fire cock.

As shown in Fig. 1, the device is adapted to be threaded by its connection 8 on to the hose connection of the fire-cock, and the hose is in turn threaded on to the connection 9 of the device.

As shown in Fig. 1, the lowermost part of the drip-chamber is provided with an ordinary drip-cock 12, which is left open when the hose is not in use. The person who turns on the water at the hydrant is expected to close this cock 12 at the same time, but if he should fail to do so it will not make much difference, as the amount of water is small that can escape thereby. When the water is turned off and the hose replaced, the drip-cock is again opened.

The leakage water will then trickle or drip down the sides of the chamber and escape by the way of the drip-cock, the flange 10 effectually preventing it from passing into the hose. The hose is therefore kept dry and its deterioration through dampness and rotting is prevented.

Since these drip-connections are sometimes horizontal or at other angles than as shown in Fig. 1, and since they may thread upon the hydrant to a greater or less extent, I prefer to leave the determination of the exact location of the drip-cock until the particular hydrant with which the device is to be used is selected. Then by attaching the device in the position in which it is to be used, the location of the drip-cock at substantially the lowest point of the chamber may be determined. A suitable threaded hole 13 is then formed in the chamber at this point and the drip-cock 12 inserted.

I have found in practice that drip-connections such as illustrated and described do not impede the flow of water under pressure therethrough. While I have described but one embodiment of the invention, it will be understood that it may take various forms, all within the scope and spirit of the appended claims.

Having thus described my invention, what I claim as new and desire to secure by Letters Patent is—

1. The combination with a stand pipe valve and a hose, of a connecting member located between said valve and hose, said member comprising a tubular connection with the valve, a tubular connection with the hose, the axes of said tubular connection being non-vertical and substantially in alinement, said member comprising also a drip collecting chamber constructed to receive the drip from the valve and to prevent it from entering the hose, and located to one side of the tubular connections.

2. The combination with a stand pipe valve and a hose, of a straight-way fitting interposed between said valve and hose, said fitting comprising a tubular connection with the valve, a tubular connection with the hose, the axes of said tubular connections being non-vertical and substantially in alinement, said fitting comprising also a drip collecting chamber constructed to receive the drip from the valve and to prevent it from entering the hose, and located to one side of the tubular connections, said fitting being provided with a tubular member extending from and in alinement with said second tubular connection and forming a wall of said chamber, the capacity of said last tubular member being at least equal to the capacity of the tubular connections.

3. The combination with a stand pipe valve and a hose, of a straight-way fitting interposed between said valve and hose, said fitting comprising a tubular connection with the valve, a tubular connection with the hose, the axes of said tubular connection being inclined and substantially in alinement, said fitting comprising also a drip collecting chamber constructed to receive the drip from the valve and to prevent it from entering the hose, and located to one side of the tubular connections.

4. The combination with a stand pipe having a port and a hose, of a connecting member located between said port and hose and having connections therewith, said hose connection being positioned to receive water under pressure from said port but out of line of gravity drip from the port, said member having a chamber in line of gravity drip from the port for collecting the drip, and means for preventing the drip from entering the hose.

5. The combination with a stand pipe having a port and a hose, of a connecting member located between said port and hose and having connections therewith, a funnel in said member surrounding said hose connection and positioned to receive water under pressure from said port but out of line of gravity drip from the port, said funnel forming with the wall of the fitting a chamber in line of gravity drip from the port for collecting drip water from the port.

In witness whereof, I have hereunto subscribed my name in the presence of two witnesses.

ANTON J. ROEFFS.

Witnesses:
R. P. TAYLOR,
N. L. JOHNSON.

Copies of this patent may be obtained for five cents each, by addressing the "Commissioner of Patents, Washington, D. C."